United States Patent [19]

Chabot

[11] 4,192,367

[45] Mar. 11, 1980

[54] ANTI-SKID WHEEL ATTACHMENT DEVICE

[76] Inventor: Ovila Chabot, 78, rue du College, Pont-Rouge, Quebec, Canada, G0A 2X0

[21] Appl. No.: 924,743

[22] Filed: Jul. 14, 1978

[51] Int. Cl.$^2$ .................. B60C 27/20; B60C 27/00
[52] U.S. Cl. ............................................. 152/225 C
[58] Field of Search ............ 152/225 R, 225 C, 228 V

[56] References Cited

U.S. PATENT DOCUMENTS

| | | | |
|---|---|---|---|
| 2,663,345 | 12/1953 | Cardell | 152/225 C |
| 2,664,934 | 1/1954 | Safran | 152/225 C |
| 3,289,727 | 12/1966 | Marks | 152/225 R |

FOREIGN PATENT DOCUMENTS 884132  10/1971  Canada ...................................... 152/225

Primary Examiner—Richard A. Bertsch

[57] ABSTRACT

A wheel attachment device adapted to provide anti-skidding of a traction wheel of a vehicle and which is characterized by a simple and sturdy construction, and a pair of separate clamping devices easy to put in place on the wheel, which are compactly stacked one on the other for stowage such as in the trunk of a car, and which are adjustably slidable relative to each other. The anti-skid wheel attachment device comprises the pair of separate clamping devices with each a pair of laterally spaced apart bars which form at one end a tire clamping portion and at the other end a connection portion. The connection portion of one clamping device slidably overlaps the other, a locking lever adjustably slides the clamping devices toward each other and a single catch holds the locking lever in operatively locking position and connects the two clamping devices.

4 Claims, 4 Drawing Figures

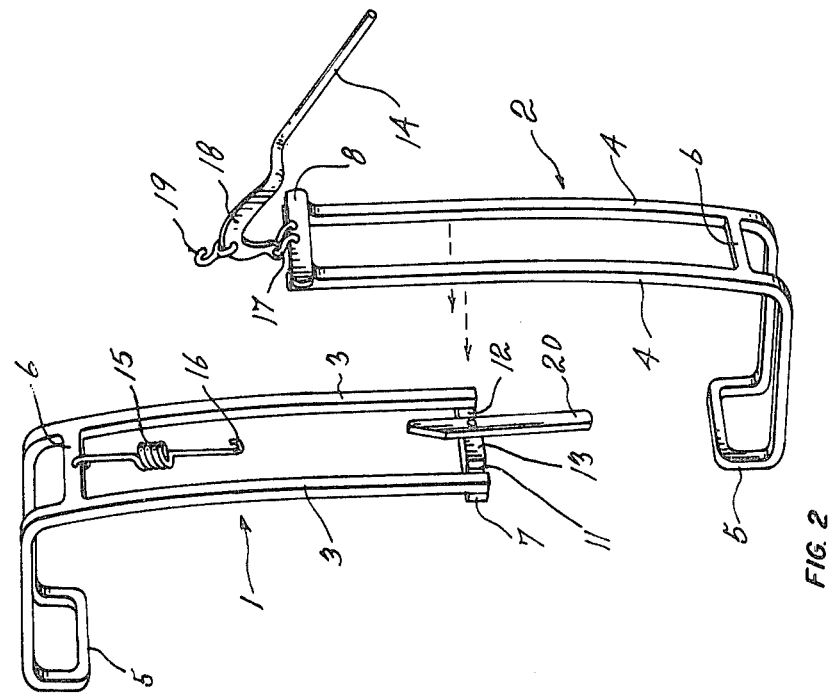
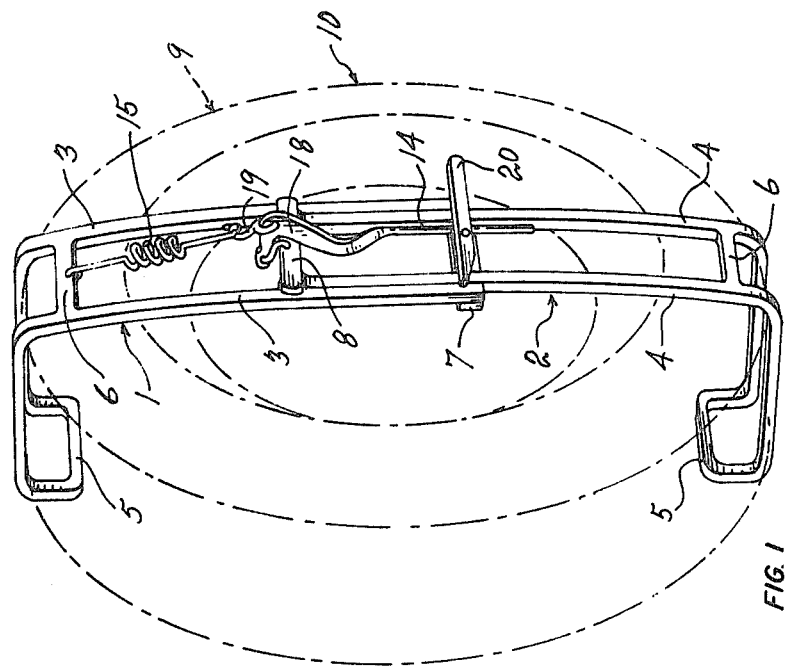

ANTI-SKID WHEEL ATTACHMENT DEVICE

This invention relates to a device of the type which attaches to a traction wheel of a motor vehicle to prevent skidding thereof such as in snow or on ice.

So far, there have been provided many anti-skid wheel attachment devices of the above type which include at least two clamping devices adapted to clamp against the bead portion of a tire to provide traction to a wheel. In the wheel attachment devices of the above type which are known, the clamping devices are joined and remain interconnected or they are disconnectable and slidably engage one in the other to operatively clamp a wheel.

The known anti-skid wheel attachment device wherein the clamping devices are joined together, are found relatively complex in construction, are relatively difficult to attach to a wheel, and are cumbersome for storage. In the known anti-skid wheel attachment device in which the clamping devices are separate and slide one in the other, the sliding engagement one in the other still makes it difficult to attach the clamping devices to a wheel.

It is a general object of the present invention to provide an anti-skid wheel attachment device of the above type which is easy to put in place or attach to a wheel.

It is another general object of the present invention to provide an anti-skid wheel attachment device of the above type which is of simple and sturdy construction and includes a pair of separate clamping devices adapted to be compactly stacked one on the other to be stowed away such as in the trunk of a car.

It is a further object of the present invention to provide an anti-skid wheel attachment device of the type including a pair of clamping devices which are adjustably slidable relative to each other in a simple manner adapted to avoid malfunctioning.

The above and other objects and advantages of the present invention will be better understood with reference to the following detailed description of a preferred embodiment thereof which is illustrated, by way of example, in the accompanying drawings, in which:

FIG. 1 is a perspective view of an anti-skid wheel attachment device associated to a wheel according to the present invention;

FIG. 2 is a perspective view of the anti-skid wheel attachment device with the clamping frames separated one from the other;

Figures 3, 4:
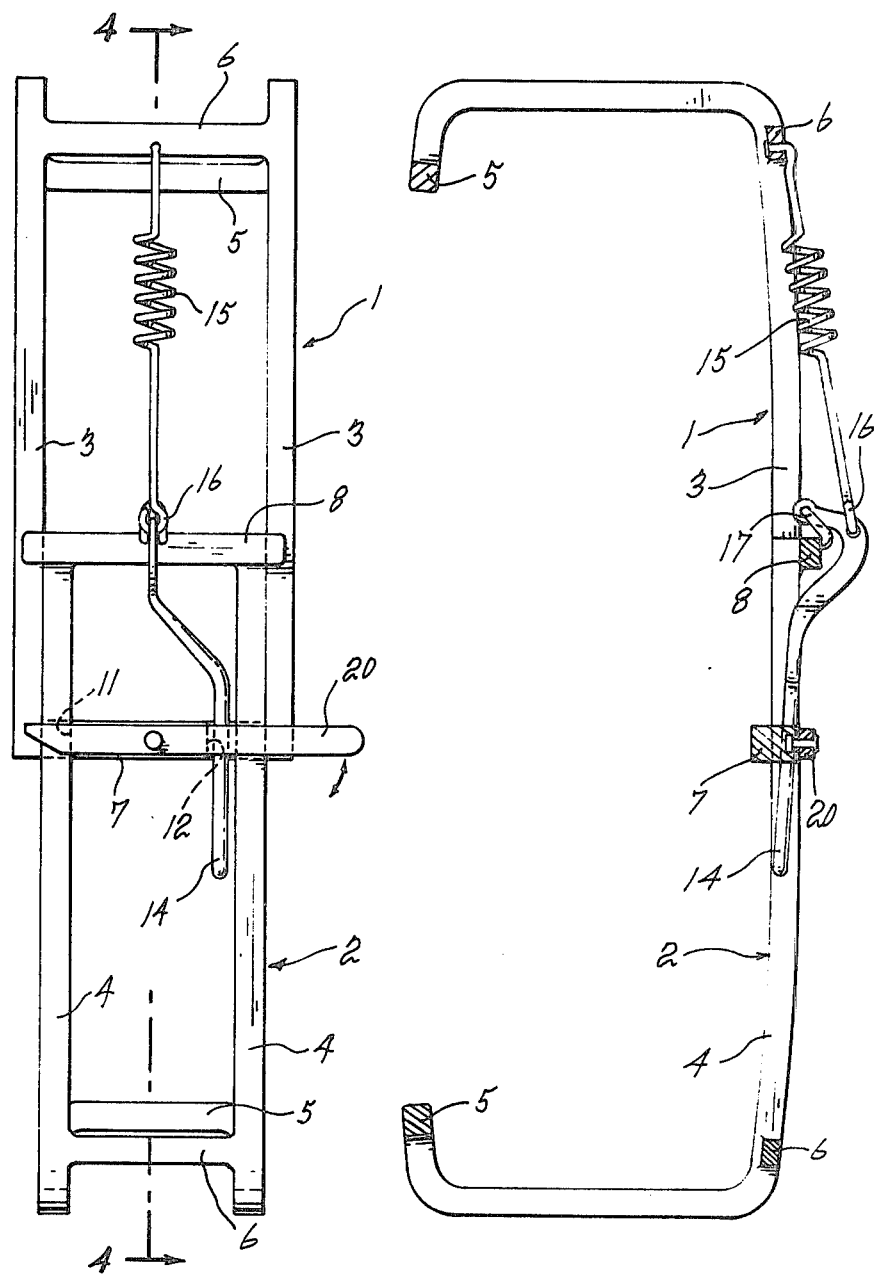
FIG. 3 is a front elevation view of the same anti-skid wheel attachment device.
FIG. 4 is a cross-sectional view of the anti-skid wheel attachment device.

The illustrated anti-skid wheel attachment device includes a pair of separate clamping frames 1 and 2. Each tire clamping frame 1 and 2 includes a pair of side bars 3,3 and 4,4 respectively. The pair of side bars 3,3 are laterally spaced apart and form a tire clamping outer portion at the radially outer end thereof, and a connection portion at the radially inner end portion thereof. Similarly, the side bars 4,4 are also laterally spaced apart and form a tire clamping outer portion at the radially outer end thereof and a connection portion at the radially inner end thereof.

Each tire clamping portion includes a portion of the corresponding side bars 3,3 or 4,4 which are bent into a U shape configuration to fit transversely onto the tire and a pair of cross members 5 and 6 cooperatively forming a rectangular frame. The spacing between the side bars 3,3 or 4,4 allows the latter to bite in the circumferential portion of the tire extending between them. The connection portion of each clamping frame includes the crossbar 6 and a crossbar 7 or 8 cooperatively forming with the side bars 3,3 or 4,4 a substantially planar rectangular frame longitudinally extending radially relative to the wheel. The sides 3,3 or 4,4 and the corresponding crossbars 5,6 and 7 form a rigid frame to strongly bite into the bead portion of the tire 9 on the wheel 10.

The lateral side bars 4,4 are laterally spaced apart closer than the lateral side bars 3,3 to slidably engage inwardly of the latter as shown in FIGS. 1 and 3. This allows the side bars 4,4 to slide endwise between the side bars 3,3 in a pair of recesses or notches 11, 12 formed in a projection 13 of the crossbar 7. The notch or recess 12 is wider than the notch 11 to also form a recess for a spring tensioning lever 14.

A spring 15 is hooked at one end to the crossbar 6 of frame 1 and has an open hook portion 16 formed at the free other end thereof. The lever 14 is pivoted at one end by a shackle 17 to the crossbar 8 of frame 2 and is formed with a crooked portion 18 to which is attached a hook 19. The locking lever 14 thus pivots in a longitudinal direction relative to and between the side bars 3,3 and 4,4 and operatively engages in the wider recess 12 transversely inward of one side bar 4, as best shown in FIG. 3.

An arm 20 is pivoted intermediate its ends on projection 13 of the crossbar 7 of frame 1 and is of sufficient length to operatively overlie the two side bars 4,4 and the lever 14 to form a catch holding the lever 14 in spring tensioning position and to maintain side bars 4,4 in alignment with bars 3,3 in cooperation with the end portions of crossbar 8 which overlie the respective side bars 3,3 and with the outward torque exerted by the two wire clamping outer portions on the connection portions. It will be noted that the two clamping frames can be assembled and separated by relative movement of their connection portions toward and away from each other in a direction transverse to the planes of said connection portions. It will be noted that crossbar 7 underlies side bars 4,4.

This anti-skid wheel attachment device is easily put in place or attached to a wheel of a vehicle by separately and successively engaging the clamping frames 1 and 2 on the wheel, while aligning the side bars 4,4 in the recesses 11 and 12 in overlying relationship with the cross bars 7 of clamping frame 1, by hooking the spring 15 to the lever 14, by pulling the latter down in the recess 12, and by finally pivoting the pivoted catch 20 such as to hold the side bars 4,4 and the lever 14 in operative position in the recesses 11 and 12.

What I claim is:

1. An anti-skid wheel attachment device comprising a pair of separate clamping frames, each including a pair of laterally spaced-apart side bars and forming a generally U-shaped tire-clamping outer portion at the outer ends of said bars and a planar connection portion at the inner ends of said side bars, the two connection portions being removably positioned in co-planar and aligned overlapping and longitudinally slidable position across the exposed side of a wheel with the respective tire-clamping outer portions engaging diametrically opposite peripheral portions of a wheel, guide means on the respective connection portions for keeping the two connection portions in co-planar position and in alignment by guiding the two connection portions in their longitudinal slidable movement one relative to the other, while allowing assembly and separation of the two connection portions by relative movement thereof toward and away from each other in a direction transverse to the planes of said connection portions, a catch movably mounted on one of said connection portions and removably engaging the other of said connection portions to maintain said two connection portions in assembled position, and manually-operable biasing means detachably connecting the two clamping frames one to the other and urging slidable movement of said connection portions in a direction such that said tire-clamping outer portions will move one towards the other.

2. An anti-skid wheel attachment device as claimed in claim 1, wherein said biasing means include a tension spring attached to one of said clamping frames and a spring tensioning lever pivotally mounted on the other of said clamping frames, and having an exposed detachable connection with said tension spring, said lever having an operating arm which, when in spring-tensioning position, extends in the plane of the two connection portions and said catch engages also said operating arm to keep the lever in spring-tensioning position when said catch is in a position to maintain said connection portions in assembled position.

3. An anti-skid wheel attachment device comprising separate first and second clamping frames, each including an outer generally U-shaped tire-clamping portion and an inner connection portion, said inner connection portion comprising a pair of spaced substantially parallel co-planar side bars adapted to be removably positioned across the exposed side of a vehicle wheel in aligned and overlapping position, each pair of side bars being rigidly interconnected by a first and a second cross bar interconnecting the outer portions and the inner ends of said side bars, respectively, said second cross bar of said first clamping frame being secured to the underside of the side bars of said first clamping frame and having a central boss level with the outer side of said side bars, said central boss defining a pair of recesses, one adjacent the related side bar, an arm pivoted on said boss intermediate its ends and pivotable between a locking position extending across said side bars of said first clamping frame and closing said recesses, and an unlocking position clearing and opening said recesses, said second cross bar of said second clamping frame extending across the outer side of the side bars of said second clamping frame and protruding beyond said same side bars, the spacing between the side bars of said second frame being less than the spacing between the side bars of said first frame, said side bars being telescopically and slidably interfitted with the side bars of said second frame slidably engaging said recesses, and said arm in transversely extending locked position overlying said side bars of said second frame and with said protruding end portions of the second cross bar of said second clamping frame overlying the side bars of the first clamping frame, so arranged that the two connection portions can be assembled and separated by relative movement toward and away from each other in a direction transverse to the planes of said connection portions, the side bars of the respective pairs being in longitudinal slidable contact two by two for maintaining the connection portions in alignment, and said cross bars maintaining said connection portions in co-planar relationship and said catch, when in locked position, maintaining the two connection portion in assembled position, and further including biasing means detachably connected to the two clamping frames and biasing the outer tire-clamping portions one towards the other.

4. An anti-skid wheel attachment device as claimed in claim 3, wherein said biasing means include a tension spring attached to one of said clamping frames, and a spring tensioning lever pivotally mounted on the other of said clamping frame and having an exposed detachable connection with said tension spring, said lever having an operating arm which, when said lever is in spring-tensioning position, extends in the plane of said side bars and said catch, when in locking position, overlies said operating arm and positively maintains said lever in spring-tensioning position.

* * * * *